(12) United States Patent
Beswick et al.

(10) Patent No.: US 8,371,554 B1
(45) Date of Patent: Feb. 12, 2013

(54) HIGH-PRESSURE STEM-ACTUATED 2-WAY VALVE

(75) Inventors: Paul R. Beswick, Newington, NH (US);
Siang Kiang Chan Beswick, legal representative, Newington, NH (US);
Gary A. Treadwell, Dover, NH (US);
Dale D. Ames, Exeter, NH (US);
Margaret E. Tomaswick, Portsmouth, NH (US)

(73) Assignee: Beswick Engineering, Inc., Greenland, NH (US)

( * ) Notice: Subject to any disclaimer, the term of this patent is extended or adjusted under 35 U.S.C. 154(b) by 338 days.

(21) Appl. No.: 12/873,286

(22) Filed: Aug. 31, 2010

Related U.S. Application Data

(60) Provisional application No. 61/238,399, filed on Aug. 31, 2009.

(51) Int. Cl.
*F16K 1/00* (2006.01)

(52) U.S. Cl. ............ 251/322; 251/83; 251/321; 137/910
(58) Field of Classification Search .............. 251/82, 251/83, 339, 214, 319, 320, 321, 322, 323; 137/910
See application file for complete search history.

(56) References Cited

U.S. PATENT DOCUMENTS 1,558,064 A * 10/1925 Thrift .................. 137/630.2
3,192,942 A *  7/1965 Manor et al. ......... 137/246.19

* cited by examiner

*Primary Examiner* — John K Fristoe, Jr.
*Assistant Examiner* — Kevin E Lynn
(74) *Attorney, Agent, or Firm* — Lorusso & Associates

(57) ABSTRACT

Stem-actuated two-way valve for precise, intermittent and repeatable delivery of fluid and/or gaseous substances from high pressure sources. A dual purpose o-ring functions as a valve seat and separates high pressure segments from low pressure segments. The novel valve stem system allows precise delivery of desired liquids and/or gases regardless of valve stem travel within a defined travel length.

17 Claims, 5 Drawing Sheets

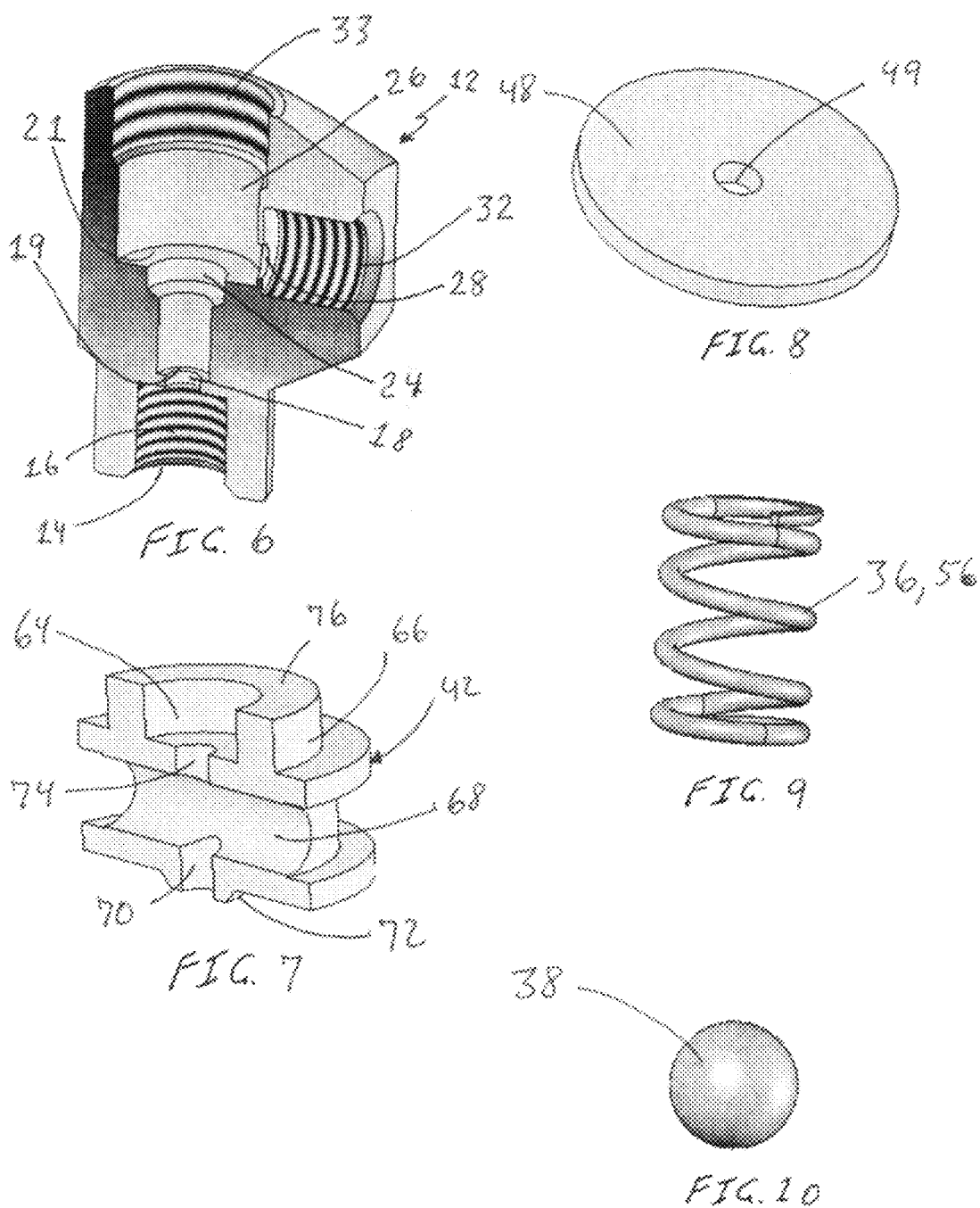

HIGH-PRESSURE STEM-ACTUATED 2-WAY VALVE

CROSS-REFERENCE TO RELATED APPLICATION

This application claims the benefit of U.S. Provisional Application No. 61/238,399 filed Aug. 31, 2009, the contents all of which are incorporated in their entirety herein by reference.

BACKGROUND OF THE DISCLOSURE

1. Field of the Disclosure

The disclosure relates generally to valves used to regulate fluid and/or gas pressure in a system and more particularly to valves employing a ball valve to regulate fluid and/or gas pressures.

2. Statement of the Prior Art

Current miniature pressure regulating valves used for devices, particularly medical devices such as inhalers, often go through long periods of little or no use (possibly years) during which the valve is not actuated. Long periods of inactivity allow environmental conditions and contained fluids and gases to erode and degrade valve components. Yet, due to the often criticality of use, the valve is expected to work properly in an instant when activated.

One gas, in particular, often used in medical devices as a propulsion source, or as a medicament, can cause severe component erosion and functional degradation if left unused over long periods of time. $CO_2$ can interact with environmental molecules to form acids and other material degrading substances when left in a contained, pressurized condition. Leaks over time, however small, result in equipment failure or poor performance. Thus, there is a need to minimize the number of components incorporated into a pressure regulator valve to reduce possible points of equipment degradation and/or failure.

Problems associated with long term non-use are further exacerbated by the need to separate a high pressure gas or fluid source from a low pressure delivery source akin to a regulator in scuba gear, or to a medical inhaler used to administer a variety of medicaments. The transition from a high pressure source to a low pressure source has to be consistent, stable and repeatable, and the resistance needed to activate a regulator valve has to be consistent also. The valve has to transition from a closed to an open configuration in a very short distance of travel to maximize the speed of fluid and/or gas delivery without compromising the precision of the quantity administered.

Further problems arise when valves used in the recited manner are required to reduce relatively high fluid or gas pressures to relatively very low pressures. Many of the prior art valves used for this purpose can only handle relatively small reductions in pressure. In addition, many such valves have problems with valve seats. It is difficult to obtain the geometries and finishes necessary to maintain a good valve seat when addressing large reductions in pressure. A yet further problem is to achieve these results with durability and longevity of components.

What is described herein solves these problems by using a stem-actuated ball valve in conjunction with a dual-purpose o-ring seal to provide a valve seat for the ball valve and to consistently and completely seal off the high pressure source from the low pressure delivery source over long periods of time. The disclosure also provides an apparatus to reduce relatively high pressures to much lower pressures in a quick, precise and repeatable manner.

SUMMARY OF THE DISCLOSURE

In one aspect of the disclosure, a stem-actuated two-way valve uses a combination of a spring actuated ball valve and a coil spring actuated valve stem to separate a high pressure fluid/gas source from a relatively low pressure delivery source. An o-ring provides a sealing means with respect to its outer diameter and inner diameter. The outer diameter seals the valve components to the apparatus body. The inner diameter creates a valve seat for the ball valve. The novel configuration reduces the number of necessary components, reduces tolerance requirements and eliminates the need for lubrication, and yet allows for the consistent, precise and repeatable delivery of dosages of the desired fluid and/or gas.

In another aspect of the disclosure, a gland plug, capture plate and retaining cap provide a communication channel for fluid/gas delivery and restrict the valve stem to a defined length of travel that ensures precise dosage delivery over at least a substantial portion of the valve stem travel. The disclosed embodiment provides excellent valve seating characteristics and sustainable fluid and/or gas flow over a wide range of pressures and fluid conditions. These and other objects and features of the disclosure will be apparent from a review of the drawings and a reading of the following detailed description of the disclosure.

BRIEF DESCRIPTION OF THE DRAWINGS

FIG. 6 is a sectional solid model perspective view of a 2-way valve body according to one embodiment of the disclosure.

FIG. 7 is a sectional perspective view of a gland plug according to one embodiment of the disclosure.

FIG. 8 is a perspective view of a capture plate according to one embodiment of the disclosure.

FIG. 9 is a solid model of a valve coil spring according to one embodiment of the disclosure.

FIG. 10 is a solid model of a ball valve according to one embodiment of the disclosure.

DETAILED DESCRIPTION

Figure 1:
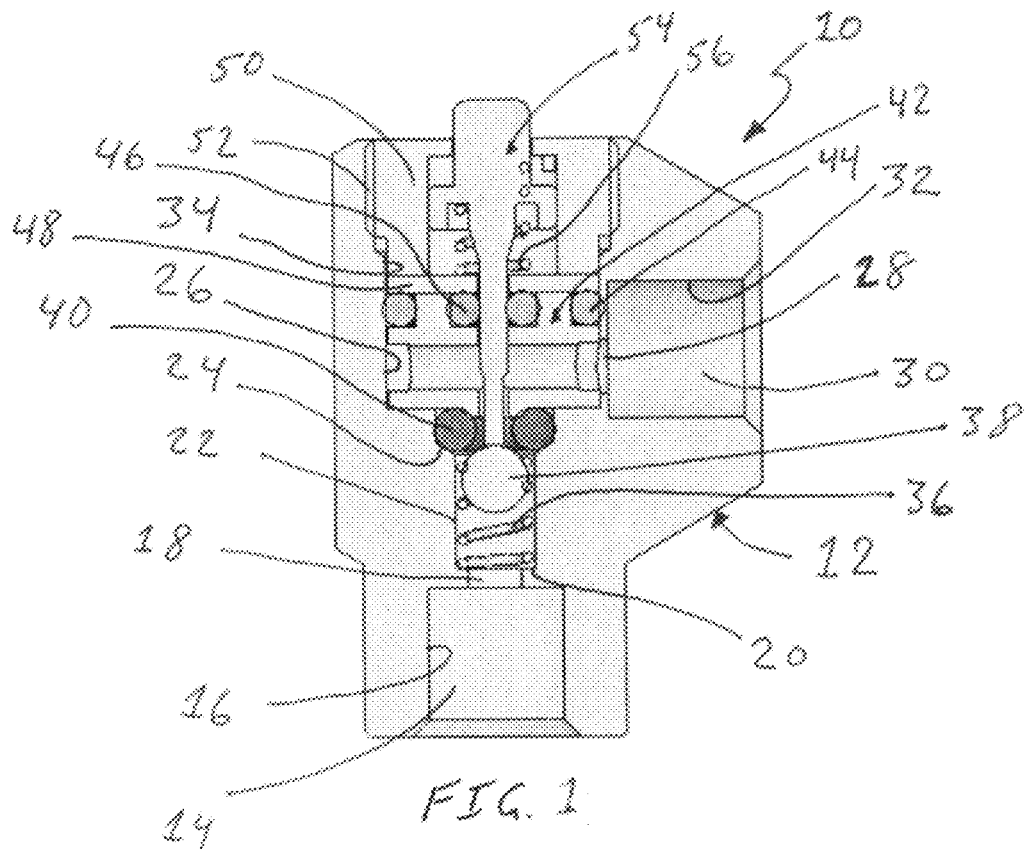
FIG. 1 is a sectional view of a stem-actuated two-way valve showing inlet and outlet ports according to one embodiment of the disclosure.

In one aspect of the disclosure, as shown in FIG. 1, a stem-actuated two-way valve 10 combines valve stem and ball valve assemblies to permit fluid/gas flow from a high pressure source to a relatively low pressure delivery source in a repeatable metered manner. The fluid/gas pressure in the high pressure segment can be up to about 1,200 psi. The pressure in the low pressure segment can range from a low of about 0 psi to a high of about 1,200 psi. The pressure in the low pressure segment may be influenced by back pressure from downstream components, such as pressure regulators, etc. Once the valve is opened, the pressure in the high pressure segment is transferred to the previously low pressure delivery segment.

Referring to FIGS. 1 and 6, the two-way valve comprises a valve body 12 having a series of ports for receiving fittings and the stem/valve subassemblies. An inlet port 14 may include inlet port threading 16 to receive threaded fittings. In an alternative embodiment, fittings may be secured to valve body 12 via other mechanical means, e.g., key and slot configurations, bayonet-style locking features, friction fit, or via adhesives.

Inlet port 14 is in fluid communication with inlet transition port 18 that physically and functionally connects inlet port 14 to a proximal end of a valve chamber 22. Valve chamber 22 is substantially cylindrical in shape and dimensioned to receive a ball valve 38 (shown in FIG. 10), and a valve spring 36. A bottom of valve chamber 22 forms an annular shoulder 20 that functions as an anchor point for valve spring 36. A proximal end of spring 36 registers against shoulder 20.

In fluid communication with a distal end of valve chamber 22 is valve seat o-ring chamber 24. Chamber 24 is dimensioned to receive a valve o-ring 40. In one aspect, an inner diameter of valve o-ring 40 functions as a valve seat for ball valve 38. In another aspect, an outer diameter functions as a seal to segment the high pressure segment that terminates at the distal end of valve chamber 22 from the remainder of valve body 12. This latter function is achieved by the interface of o-ring 40 with the substantially cylindrical wall of o-ring chamber 24.

A distal end of o-ring chamber 24 is physically and functionally in fluid communication with a gland plug chamber 26. Gland plug chamber 26 is also substantially cylindrical in shape with a diameter greater than the diameter of o-ring chamber 24. A proximal end of chamber 26 forms an annular gland plug chamber shoulder that interfaces with a gland plug 42. A distal end of chamber 26 transitions into, and is in fluid communication with a valve stem cap chamber 34.

Valve stem cap chamber 34 is substantially cylindrical in shape with a diameter greater than the diameter of gland plug chamber 26. At least a portion of a wall defining chamber 34 may be formed with threading to receive a threaded valve stem retaining cap 50.

Valve body 12 has portions defining a laterally disposed outlet connector port 28 that physically and functionally connects to gland plug chamber 26. A radially distal end of port 28 physically and functionally connects to an outlet port 30 at least a portion of which may be formed with threading 32 on a wall defining the port to receive threaded fittings. Similar to inlet port 14, in alternative embodiments, outlet fittings may be secured to valve body 12 via other mechanical means, e.g., key and slot configurations, bayonet-style locking features, friction fit, or via adhesives.

Figure 2:
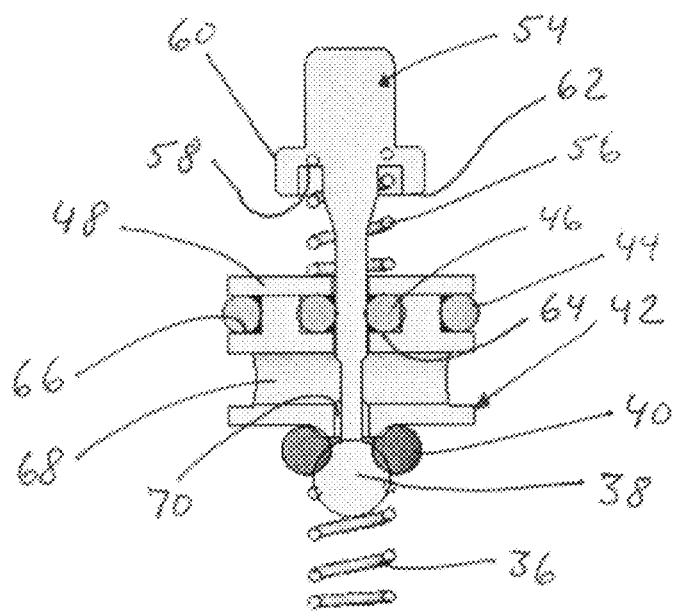
FIG. 2 is a sectional view of a stem-valve subassembly according to one embodiment of the disclosure.
Figure 5:
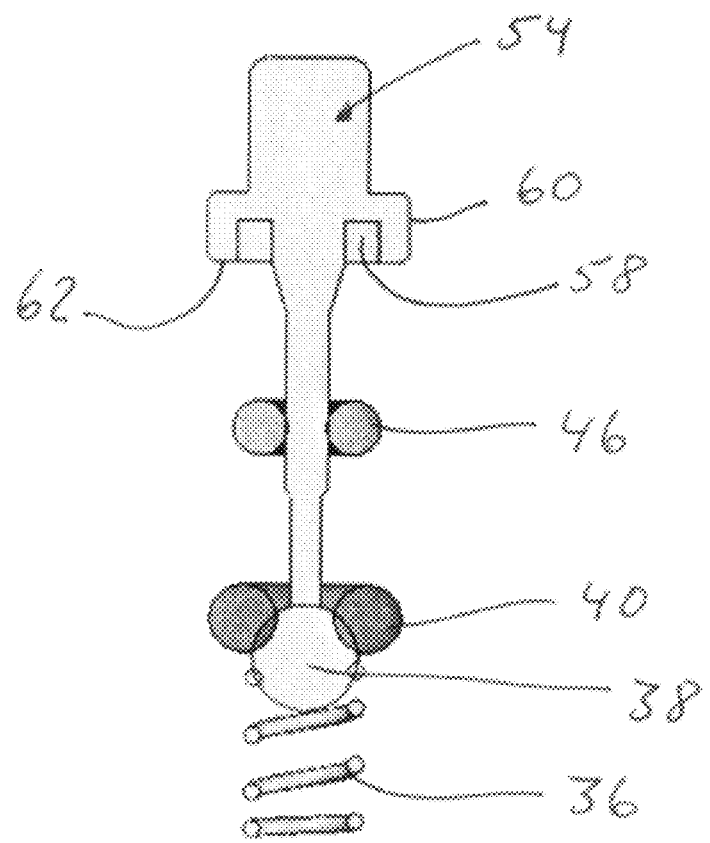
FIG. 5 is a side sectional view of a valve stem/ball valve subassembly according to one embodiment of the disclosure.

Having described valve stem body 12, attention will now be drawn to the internal subassemblies. Referring to FIGS. 2 and 5, a valve stem/ball valve subassembly is shown. Valve stem 54 has a radially extended annular extension 60 dimensioned to register against a stem chamber 59 described below. An annular spring channel 58 is formed on a bottom surface of extension 60 to receive a valve stem spring 56 (shown in FIG. 9). An annular wall defining channel 58 is dimensioned to prevent lateral displacement of spring 56. Extension 60 performs the additional function of limiting the travel of valve stem 54 when depressed. Travel can also be limited by the compressed length of valve stem spring 56. The combination of extension 60 and channel 58 allow for the use of a large valve stem spring to impart greater resistance to vertical displacement of valve stem 54.

Figure 12:
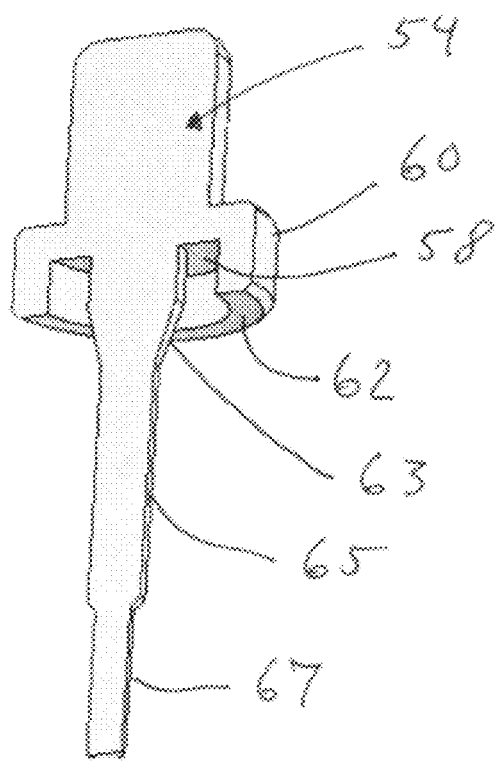
FIG. 12 is a sectional perspective view of a valve stem according to one embodiment of the disclosure.

Referring additionally to FIG. 12, valve stem 54 has a shaft 65 with a cross-sectional dimension reduced from its point of origin in a head of the valve stem. The transition in dimension is via tapered portion 63. Shaft 65 is dimensioned to fit within apertures formed in a capture plate 48 and a gland plug 42. A distal segment 67 is further tapered to enlarge an annular flow area for fluid and/or gas entering the gland plug from valve chamber 22. The reduced cross-sectional dimension of segment 67 has to be sufficiently large to sustain actuation forces and small enough to maximize flow through valve 10. A distal tip of segment 67 may be of a micro fine finish to reduce wear on valve seat o-ring 40.

Figure 3:
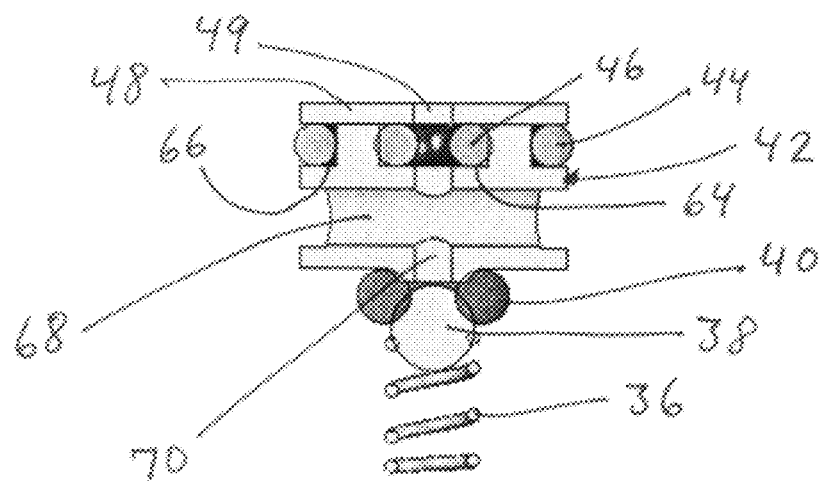
FIG. 3 is a side sectional view of a gland plug, capture plate and ball valve subassembly according to one embodiment of the disclosure.
Figure 4:
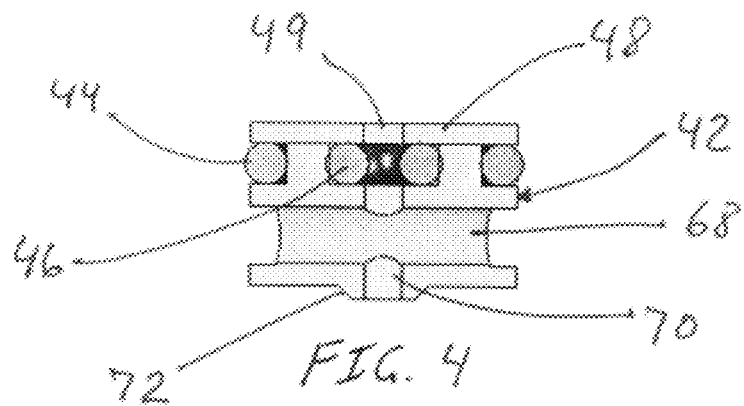
FIG. 4 is a side elevational view of a gland plug/capture plate subassembly according to one embodiment of the disclosure.

Referring additionally to FIGS. 3, 4 and 7, gland plug 42 has a substantially cylindrical shape dimensioned to slide within gland plug chamber 26. Plug 42 includes portions defining an outer annular gland o-ring channel dimensioned to receive an outer gland plug o-ring 44. O-ring 44 creates a seal between gland plug 42 and gland plug chamber 26. This effectively prevents fluids and/or gases introduced into the gland plug from migrating into the valve stem chamber 34. Plug 42 has additional portions defining an inner gland o-ring channel 64 dimensioned to receive an inner gland plug o-ring 46. O-ring 46 creates a sliding seal between gland plug 42 and valve stem shaft 65. Shaft 65 is maintained in contact with inner o-ring 46 throughout its functional range of motion to ensure a continuous seal to prevent migration of fluids and/or gases introduced into gland plug chamber 26.

Plug 42 has further portions defining a lateral through bore 68 positioned to receive and direct fluids and/or gases into outlet port 30 from valve chamber 22. An annular channel 71 is formed about the circumference of gland plug 42 at the same vertical location as bore 68. Channel 71 and bore 68 are in fluid communication. By having channel 71 formed around the perimeter of gland plug 42, the unimpeded flow of fluids and/or gases is assured despite the alignment and orientation of bore 68 with transition port 28. To permit shaft 65 to translate within plug 42 two vertically aligned apertures are formed in the plug. A top aperture 74 is dimensioned to receive shaft 65 in sliding engagement. A bottom aperture 70 is dimensioned to be larger than distal segment 67. The difference between the cross-sectional dimension of segment 67 and the diameter of aperture 70 provides an annular gap through which fluids and/or gases flow into bore 68 when ball valve 38 is depressed away from valve o-ring 40.

A bottom end of aperture 70 is defined by a raised, downwardly extending ring 72 that may be formed with a tapered outer wall to register against valve o-ring 40 to maximize surface area contact with the o-ring to provide a more robust seal.

To secure inner o-ring 46 and outer o-ring 44 to gland plug 42, capture plate 48 is positioned directly above gland plug 42 and registers against a top surface of plug 42 and both o-rings. As shown in FIG. 8, capture plate 48 is substantially cylindrical in shape and has portions defining a capture plate aperture 49 dimensioned to receive in sliding engagement, shaft 65. The outer dimension of plate 48 is substantially the same as the outer dimension of gland plug 42 to allow plate 48 to fit securely within gland plug chamber 26. Plate 48 provides the additional functions of acting as a stop for valve stem 54 and as a support surface for spring 56.

Figure 11:
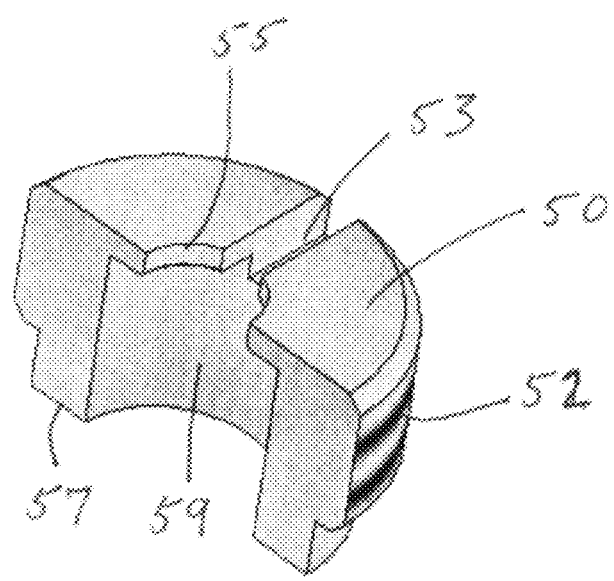
FIG. 11 is a sectional perspective view of a retaining cap showing a valve stem chamber according to one embodiment of the disclosure.

Referring to FIGS. 1 and 11, valve stem retaining cap 50 is substantially cylindrical in shape with portions defining a cylindrical cap bore 59 dimensioned to receive extension 60 of valve stem 54. A top circular end 61 of cap bore 59 functions as a stop that limits the upward travel of valve stem 54 when a top surface of extension 60 registers against end 61.

Formed in a top surface of cap 50 is valve stem aperture 55 dimensioned to receive a top cylindrical portion 57 of valve stem 54 in sliding engagement. Portion 57 is dimensioned to extend upwardly above cap 50 when the components are completely assembled to body 12. This allows access to valve stem 54 for activation.

Formed on the outer annular surfaces of cap 50 are cap threading 52 spaced to matingly engage threading 33 formed in valve cap chamber 34. To ease the process of torquing cap 50 onto body 12, a slot 53 may be formed on a top surface of cap 50 to enable the mechanical assistance of a screw driver or like implement.

Having described the components of the novel 2-way valve, assembly of the valve is performed as follows. Valve spring 36 is inserted into valve chamber 22. Spring 36 may be selected from a variety of sizes to impart the desired resistive force. The limiting factor is the physical size must not exceed the dimensions of chamber 22. Next, ball valve 38 is placed on spring 36. Valve o-ring 40 is next secured into valve o-ring chamber 24. To secure o-ring 40 within body 12, gland plug 42 is placed inside gland plug chamber 26 until a bottom end registers against a bottom surface of chamber 26 and registers against the top exposed surface of valve o-ring 40.

Once gland plug 42 is properly oriented in body 12, inner o-ring 46 and outer o-ring 44 are secured into their respective annular channels as described above. To secure the o-rings within gland plug 42, capture plate 48 is positioned within gland plug chamber 26 until a bottom surface of plate 48 registers against a top surface of plug 42 and against the top exposed surfaces of inner o-ring 46 and outer o-ring 44.

To secure valve stem 54 into the partially assembled valve, valve stem spring 56 (shown in FIG. 9), is positioned about shaft 65. The combination of valve stem 54 and spring 56 are placed into valve stem cap chamber 34 until a bottom end of spring 56 registers against capture plate 48. Next, retaining cap 50 is placed above stem 54 so that aperture 55 is aligned with portion 57. Cap 50 is lowered about stem 54 until threading 52 contacts threading 33. Cap 50 is now torqued onto body 12 to secure the aligned components within body 12. Inlet port 14 and outlet port 30 are now ready to receive fittings according to a desired application.

In operation, in a closed position, valve stem spring 56 urges valve stem 54 upwardly so as to allow ball valve 38 to register against valve o-ring 40. With the absence of restriction and force from valve stem 54, ball valve 38 is urged against valve o-ring 40 by valve spring 36. When ball valve 38 is seated against valve seat o-ring 40, high pressure fluids and/or gases introduced into valve 10 via inlet port 14 are effectively arrested from migrating beyond valve chamber 22.

To allow the migration of introduced fluids and/or gases into gland plug 42, transition port 28 and outlet port 30, the valve operator depresses valve stem 54 with sufficient force to overcome the resisting force of valve stem spring 56. Downward movement of valve stem 54 causes distal segment 67 (registered against ball valve 38) to urge ball valve 38 away from valve seat o-ring 40 and overcome the resistive force of valve spring 36. This allows the flow of fluid and/or gas from valve chamber 22 into inlet transition port 18, gland bore 68, outlet transition port 28 and outlet 30.

The discloses valve may be specifically used, among other uses, for the control of $CO_2$ up to pressures of about 1,200 psi in either liquid or gaseous phases. The primary materials used are stainless steel due to the material's strength, wear resistance and corrosive-resistance. High-impact plastics, however, may also be used to handle the high pressures introduced into the valve.

The novel valve operates with minimal force, dependant on actual operating pressures, from about 0 psi to about 1,200 psi, due to the miniature valve seat area. The valve can be transitioned from a fully off (valve fully seated) to a fully on (valve fully unseated) position in less than about 0.035" of displacement. This ensures complete dosage delivery over a substantial portion of the valve stem's defined travel distance. A generous flow rate is achieved despite the small valve seat area due, in part to the tapered distal segment 67 of valve stem 54. The novel configuration provides a leak-free valve usable in intermittent fashion without the need for lubrication of the moving components.

The minimization of parts, e.g., the dual function valve o-ring, provide savings in assembly, inspection, manufacturing costs and thermal loss. Due to the advantageous sealing properties of the o-ring components, manufacturing tolerances can be eased as a leak-free seal can be achieved even with imperfect ball valve surfaces.

Valve o-ring 40 may be constructed from 90 durometer cast urethane that exhibits superior low permeation characteristics and good resistance to deformation under load. Ball valve 38 may be constructed from stainless steel due to its excellent corrosion resistance and micro surface finish, which when mated with the valve seat o-ring 40, forms a robust seal.

Valve spring 36 and valve stem spring 56 may be compression springs constructed from stainless spring steel again due to the materials excellent corrosion resistance and resistance to strain relieve. Inner and outer o-rings, 46 and 44, respectively, made be constructed from M-class rubber (EPDM) that tends to swell and exhibit low levels of permeation when exposed to liquid $CO_2$. The swelling and permeation start to appear under prolonged exposure to high pressure $CO_2$, which does not occur with the current valve configuration arranged in a normally off position. In the event of exposure to high pressure $CO_2$, any swelling of the o-rings will not affect the o-ring performance. Conversely, swelling tends to increase the seal area and thus improves seal performance.

The containment and alignment of the seal elements in valve 10 are important to its performance and are ensured with the dimensions of O-ring cavities, concentricity requirements and the associated tolerances of the internal components. Valve o-ring chamber 24 should be tightly controlled with tolerances ensuring proper crush requirements of the small cross-section valve seat O-ring 40: too much crush and the seal can extrude and block the fluid passageway, too little and leaks will form around the seal. The upper o-rings seals require the same attention to detail, but too much crush on those seals will create assembly issues as opposed to performance issues.

Control of the diameters of the other internal valve elements and their respective concentricity specifications (shown throughout the drawings), and tolerances support gland plug chamber 26 functional requirements. Gland plug chamber 26 is dimensioned for a slip fit of the plug and holds the upper seals in proper position for sealing. Retaining cap 50 and gland plug 42 are concentrically contained in chambers 34 and 26, respectively, and guide valve stem 54 which tends to minimize the effects of side-loading on the stem. A misalignment of the stem or any of the elements may cause, among other possible problems, the valve seat to be torn, the ball valve to be forced off its seat, a leak condition to develop in the upper seal, and possible wear on valve stem 54. Thus, the components should be aligned concentrically to ensure proper performance.

The stem-actuated two-way valve disclosed herein exhibits superior performance with respect to component durability and provides a highly precise and repeatable means to deliver desired dosages of fluids and/or gases for a variety of purposes including the precise administration of medicaments such as $CO_2$, which is now used as a medication for the relief of migraine headaches. The valve effectively creates high pressure and low pressure segments that enable pressurized fluids to be quickly converted to gases upon valve operation.

While the present disclosure has been described in connection with one or more embodiments thereof, it will be apparent to those skilled in the art that many changes and modifications may be made without departing from the true spirit and scope of the disclosure. Accordingly, it is intended by the appended claims to cover all such changes and modifications as come within the true spirit and scope of the disclosure.

Having thus described my disclosure, what we claim as new and desire to secure by United States Letters Patent is:

1. A stem-actuated two-way valve comprising:
   a valve body having portions defining a valve chamber, a gland plug chamber and a valve stem cap chamber wherein the chambers are in fluid communication;
   a ball valve and a ball valve spring secured in the valve chamber;
   a gland plug secured in the gland plug chamber, wherein the gland plug has a top surface with portions defining an annular outer o-ring channel and further defining an inner o-ring channel, and wherein the gland plug has a bottom surface having portions defining a downwardly extending ring; an outer o-ring secured in the outer o-ring channel and an inner o-ring secured in the inner o-ring channel; and
   a valve stem having portions defining a distal segment wherein the distal segment registers against the ball valve and the valve stem is secured in the valve stem cap chamber a valve stem spring having an end registered against the valve stem; a capture plate registered against the gland plug and positioned in the gland plug chamber, wherein the capture plate is registered against a top surface of the gland plug and registered against the outer o-ring and the inner o-ring, and wherein a second end of the valve stem spring is registered against a top surface of the capture plate, and, a valve seat o-ring secured in the valve chamber, wherein the valve seat o-ring registers against the downwardly extending ring.

2. The valve of claim 1 wherein the valve body further comprises an inlet port in fluid communication with the valve chamber and an outlet in fluid communication with the gland plug chamber.

3. The valve of claim 2 further comprising a retaining cap secured into the valve stem cap chamber.

4. The valve of claim 1 wherein the gland plug further comprises a lateral through bore.

5. The valve of claim 4 wherein the gland plug has portions defining an annular channel in fluid communication with the through bore.

6. The valve of claim 2 further comprising an inlet transition port formed in the valve body, wherein the inlet transition port is in fluid communication with the inlet port and the valve chamber.

7. The valve of claim 6 further comprising a transition port formed in the valve body, wherein the transition port is in fluid communication with the gland plug bore, the gland plug annular channel and the outlet port.

8. The valve of claim 2 wherein the valve stem has portions defining an annular extension, wherein the extension registers against the retaining cap.

9. The valve of claim 8 wherein the annular extension has portions defining an annular channel, wherein an end of the valve stem spring is secured in the annular channel.

10. A stem-actuated ball valve comprising:
    a valve body having an inlet port, an outlet port, a valve chamber, a gland plug chamber and a valve stem cap chamber wherein the ports and the chambers are in fluid communication;
    a valve stem having portions defining a valve stem annular channel and portions defining a tapered distal segment, wherein the valve is positioned in the valve stem cap chamber and the gland plug chamber;
    a valve stem spring secured in the valve stem cap chamber, wherein one end of the valve stem spring is secured in the valve stem annular channel;
    a gland plug having a top surface having portions defining an annular outer o-ring channel and portions defining an annular inner o-ring channel, wherein the gland plug has further portions defining a through bore and portions defining an annular channel in fluid communication with the through bore, and wherein the gland plug has a bottom surface having portions defining a downwardly extending ring, wherein the valve seat o-ring registers against the downwardly extending ring;
    an outer o-ring secured in the outer o-ring channel and an inner o-ring secured in the inner o-ring channel;
    a capture plate secured in the gland plug chamber and registered against a top surface of the gland plug and further registered against the outer o-ring and the inner o-ring, wherein a top surface of the capture plate is registered against a second end of the valve stem spring;
    a valve seat o-ring secured in the valve chamber;
    a ball valve secured in the valve chamber and registered against the valve seat o-ring;
    a valve spring secured in the valve chamber and registered against the ball valve at one end and a bottom surface of the valve chamber at a second end; and,
    a retaining cap secured to the valve stem cap chamber and registered against the valve stem and the top surface of the capture plate.

11. A method of delivering fluids and/or gases comprising: providing the valve of claim 10; and operating the valve to deliver fluids and/or gases.

12. The valve of claim 4 further comprising a retaining cap secured into the valve stem cap chamber.

13. The valve of claim 5 further comprising a retaining cap secured into the valve stem cap chamber.

14. The valve of claim 6 further comprising a retaining cap secured into the valve stem cap chamber.

15. The valve of claim 8 further comprising a retaining cap secured into the valve stem cap chamber.

16. The valve of claim 2 wherein the gland plug further comprises a lateral through bore.

17. The valve of claim 16 wherein the gland plug has portions defining an annular channel in fluid communication with the through bore.

* * * * *